Sept. 5, 1950            F. A. PARSONS            2,521,185
MACHINE TOOL TRANSMISSION AND CONTROL MECHANISM
Filed Aug. 10, 1945                                           5 Sheets-Sheet 1
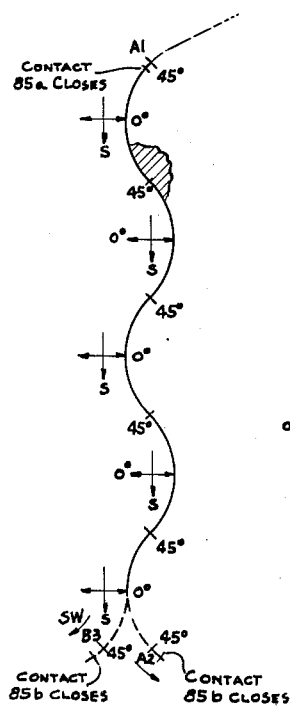
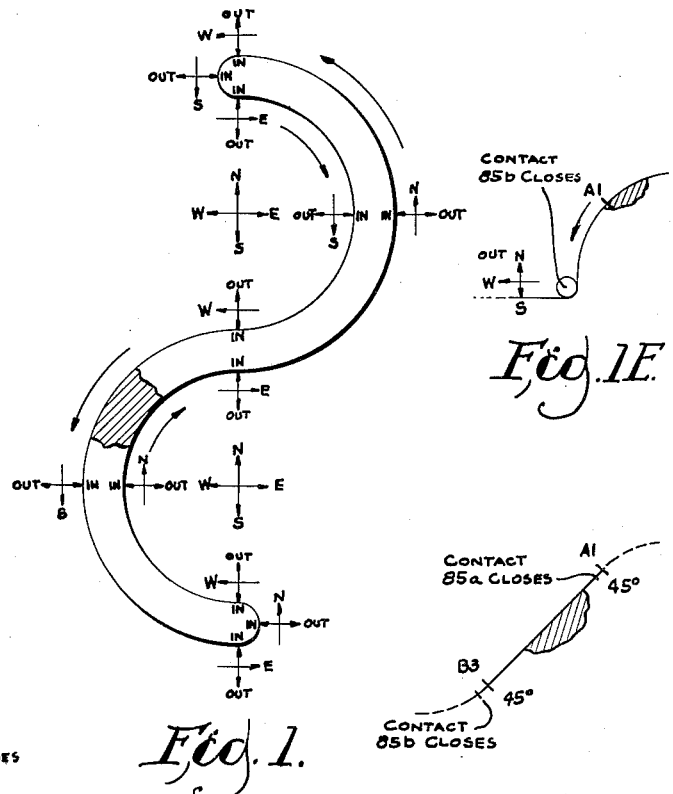
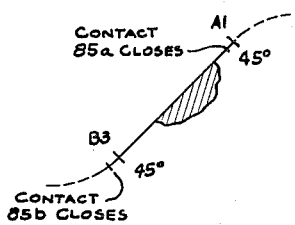
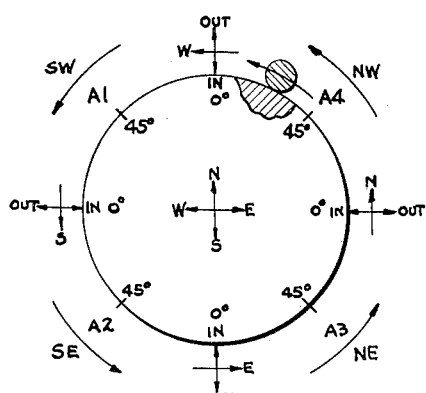
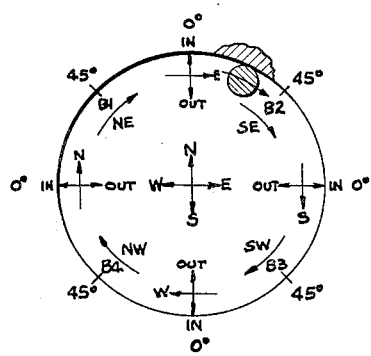
INVENTOR
Fred G. Parsons

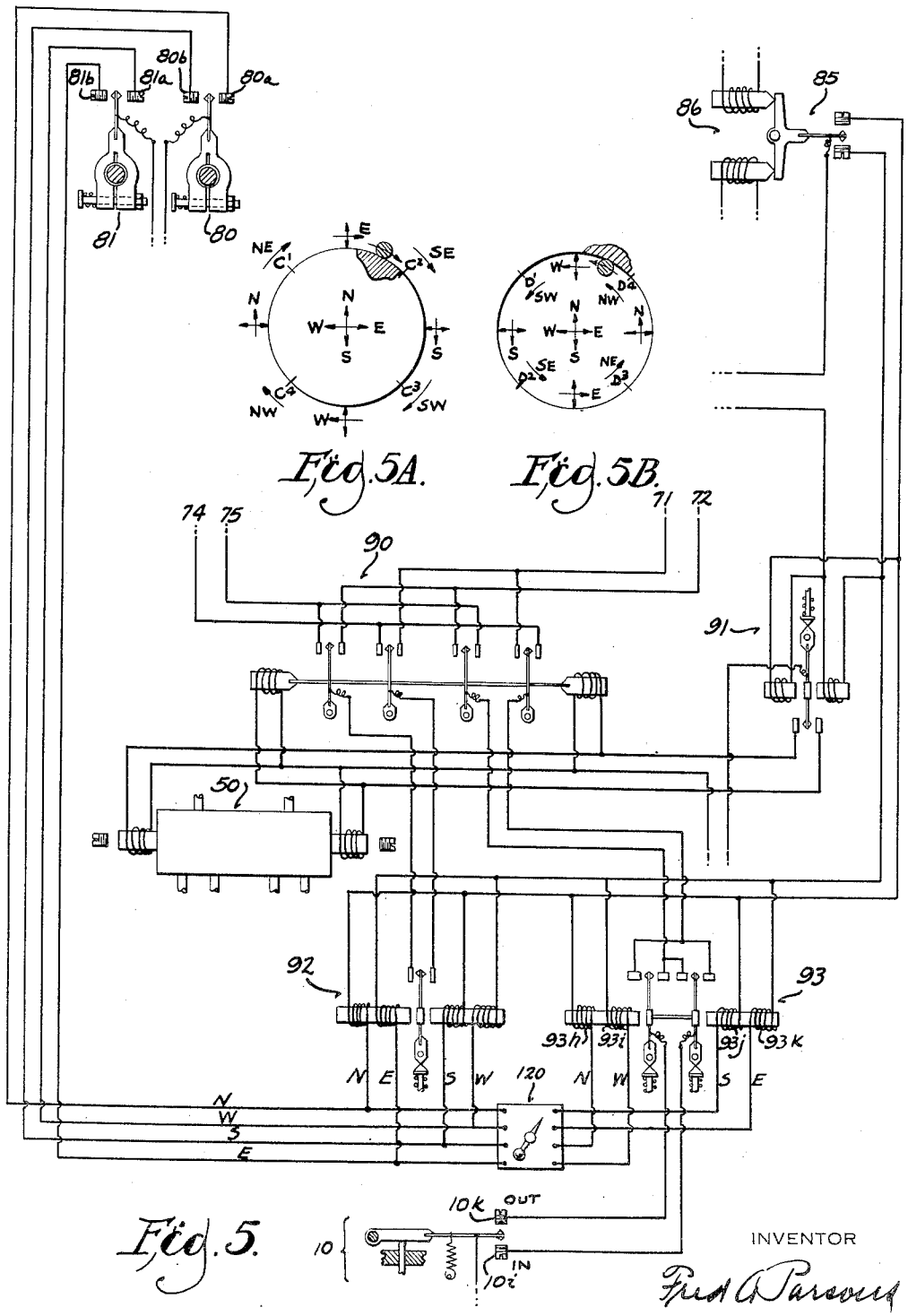

Patented Sept. 5, 1950

2,521,185

UNITED STATES PATENT OFFICE 2,521,185

MACHINE TOOL TRANSMISSION AND CONTROL MECHANISM

Fred A. Parsons, Milwaukee, Wis., assignor to Kearney & Trecker Corporation, West Allis, Wis., a corporation of Wisconsin Application August 10, 1945, Serial No. 610,090

18 Claims. (Cl. 90—13.5)

This invention relates to machine tools and particularly, but not exclusively, to copying machines. In some of its aspects the present invention is an improvement upon inventions shown in copending applications Serial No. 512,112 filed November 29, 1943 and now Patent No. 2,493,827, granted Jan. 10, 1950, and Serial No. 600,205, filed June 18, 1945, and now Patent No. 2,493,828, granted Jan. 10, 1950.

A purpose of the invention is to provide a machine tool transmission and control mechanism of an improved form, and particularly for copying machines.

A further purpose is to provide a machine tool which will automatically follow the peripheral contour of any pattern, irrespective of the range of angular movements required for the operation.

To effect the result just mentioned the machine requires transmission and control mechanism which is operative for relative movement of the work and tool through a range of at least 360° of clockwise angular movements and also through a range of at least 360° of counter-clockwise movement, and which is operative to copy different pattern angles in any order in which they can occur in any one pattern. A further purpose of the invention is, therefore, to provide a copying machine operable for automatically following any angular movements which may be required for 720° of combined clockwise and counter-clockwise movement and in any order of their occurrence.

A further purpose is to provide a copying machine having a range of 720° of angular copying, as just mentioned, which is operable to copy any portion of the pattern periphery selectively in either clockwise or counter-clockwise direction.

In the copending applications previously identified there is explained copying transmission and control mechanism including a primary control means operative in a manner to minimize any initial overrun or in-out oscillations such as normally occur during any copying operation whenever there is a change of pattern-angle direction, the primary control means also operating to substantially instantly stabilize any initial oscillations or jiggles in a form of minimum amplitude and thereafter to progressively reduce the oscillation amplitude to substantially zero value in a minimum time. A further purpose of the present invention is to provide a copying machine in which a similarly operative primary control means is operatively available through the range of 720° of angular copying previously mentioned.

A further purpose is to provide a copying machine including a supplemental straight-path control means operatively available through a 720° range of copying to substantially or completely eliminate oscillations or jiggles in the tool path during the copying of any straight-path pattern portion, irrespective of the instant angle of the movement.

A further purpose is to provide a machine tool having control means such that the movements of a plurality of supports may be controlled either for automatically following a pattern through a range of 720° as previously mentioned, or controlled for manually selected directional movements of the supports.

A further purpose is to provide a machine tool having control mechanism such as just mentioned in a form which operates automatically for the automatic copying control to become effective whenever the operation of the manual control moves the supports to a zone of their relative movement which is normally intended to be controlled by the instant pattern.

A further purpose is generally to simplify and improve the construction, organization and operation of copying machines, and particularly for copying machines having a range of 720° of automatic copying movement. Still other objects will be apparent from this specification.

Various modifications of the invention herein illustrated, described and claimed are contemplated, and it is to be understood that the invention includes all modifications which are within the spirit and scope of the claims.

Throughout the specification the same reference characters have been used to identify the same parts, and in the drawings:

Figures 1, 1A, 1B, 1C, 1D, 1E are diagrams representing certain pattern configurations which may be copied in the present machine.

Figure 3A is a diagrammatic view for explanation of the operation of a portion of the control mechanism of Fig. 3.

Figure 2:
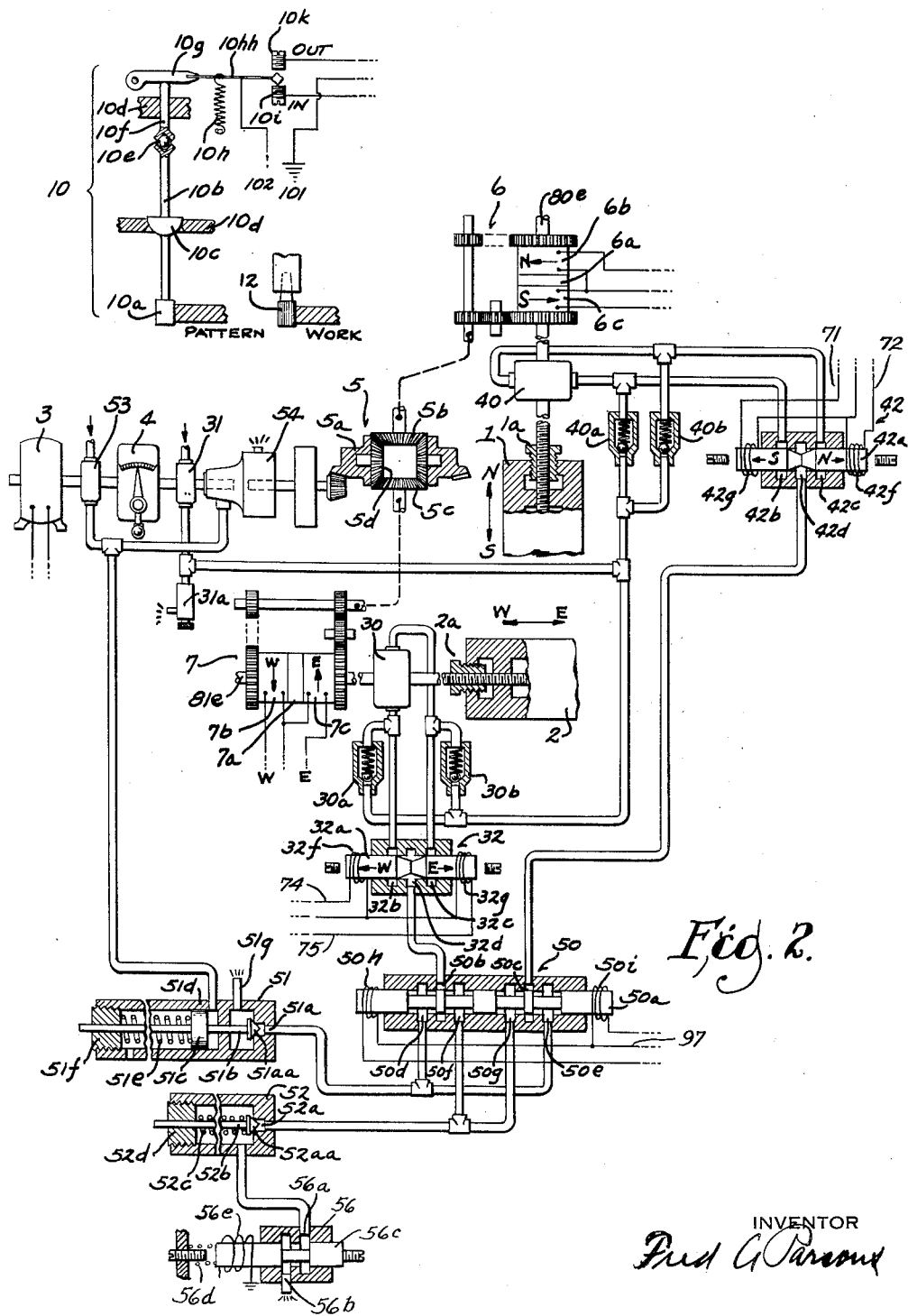
Figure 2 is a diagram of the transmission mechanism of the machine, together with some of the control mechanism associated therewith.
Figure 3:
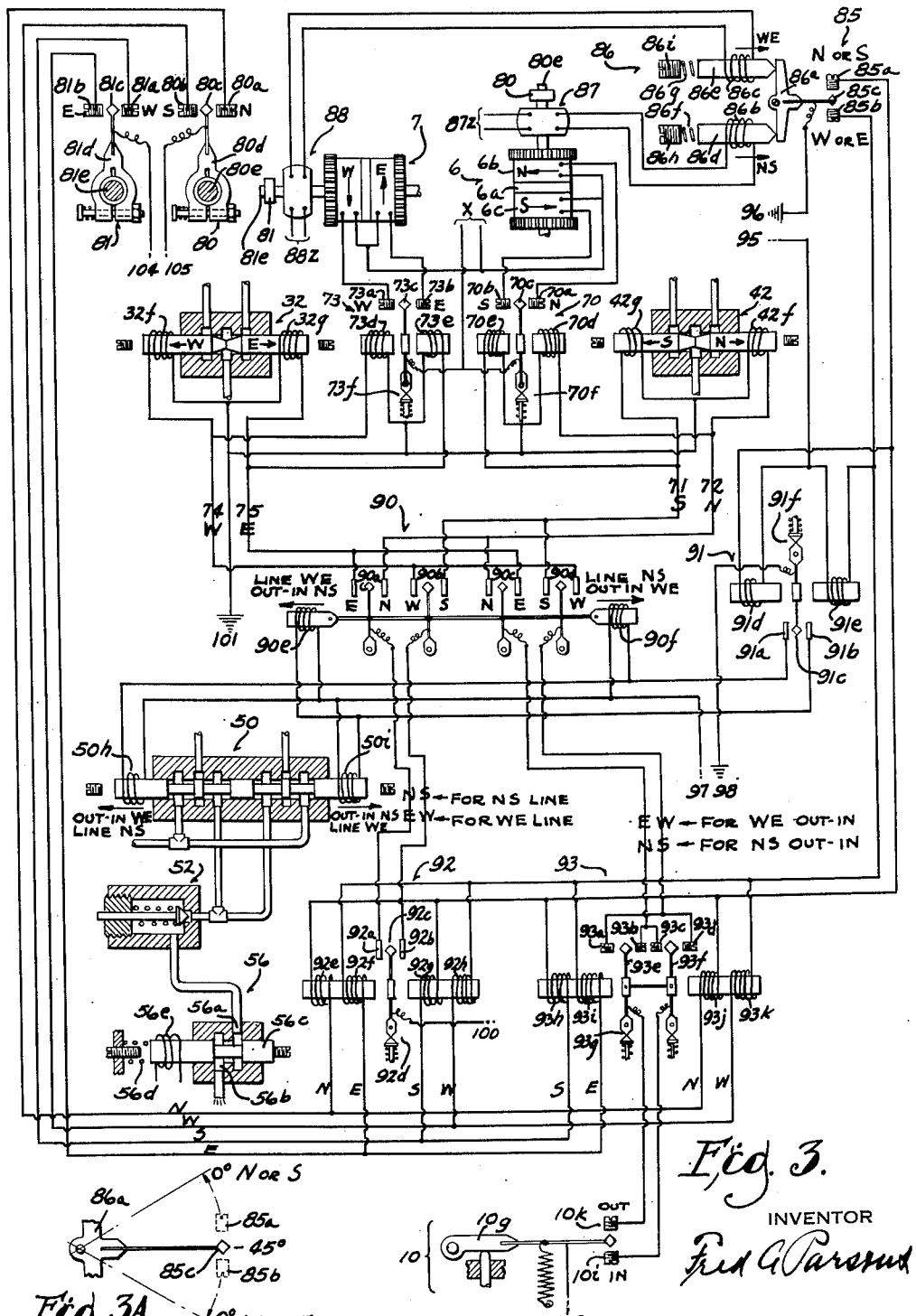
Figure 3 is a diagram of the control mechanism which is associated with the transmission and control mechanism of Fig. 2 for effecting an available range of 720° of combined counter-clockwise and clockwise angular copying where the counter-clockwise copying is outside the pattern, as indicated in Figs. 1, 1A, and the clockwise copying is inside the pattern as in Figs. 1, 1B.

Figure 5 is a diagram showing a modified form of the transmission and control mechanism of Figs. 2, 3, operative to effect a range of 720° of copying in either direction. That is to say the outside copying may be counter-clockwise and the inside copying clockwise as shown in Figs. 1, 1A, 1B or, alternatively, the outside copying may be clockwise and the inside copying counterclockwise as shown in Figs. 5A, 5B.

Figs. 5A, 5B are diagrams, respectively of 360° of clockwise outside copying and of 360° of counter-clockwise inside copying, such as may be effected by the control mechanism of Fig. 5.

In the present machine a range of 720° of peripheral copying such as is shown in Figs. 1, 1A, 1B, for example, is effected by movements of supports 1 and 2, Fig. 2, in mutually perpendicular NS and WE paths. At any given instant one path is controlled for effecting any required out movement in a direction away from the pattern or in movement in a direction toward the pattern, and the other path is controlled for line or traversing movement. For peripheral copying, the particular path controlled for in-out movement is changed from time to time as may be required to maintain the direction of movement generally toward and from the pattern, the other path being controlled simultaneously for line movement at right angles thereto and in a direction generally tangentially of the pattern. It results that for any 360° of circular copying in either direction, as in Figs. 1A, 1B, 5A, 5B, for example, there are four points where all of the movement is line movement in a single one of the four possible N, S, W, or E directions, as indicated in the diagrams. At each of such points the instant copying angle is 0° as measured from a base line parallel to the instant NS or WE line path. For circular copying, as in Figs. 1A, 1B etc. the four line directions at the 0° points occur in predetermined order or sequence, but the order is reversed when the copying changes from clockwise to counter-clockwise, or vice versa. Thus for the counter-clockwise copying of Fig. 1A the line direction sequence at the 0° points is W—S—E—N—W etc., while for the clockwise copying of Fig. 1B the sequence is E—S—W—N—E etc. For irregular pattern peripheries the line directions at 0° points may occur in miscellaneous order as determined by the pattern configuration, although normally a N or S direction of 0° line movement will occur between E and W line directions, and vice versa, see Fig. 1 etc.

Each of the four different N—S—W—E line directions occurring at the 0° copying points as above mentioned requires a different instant line and out-in direction-combination in order to maintain the stylus and cutter paths in conformity with the 0° pattern contour. Thus, referring to the counter-clockwise copying of Fig. 1A, it will be seen that four $$\text{line } \frac{\text{out}}{\text{in}}$$

direction-combinations occur in a sequence $$W\frac{N}{S}, S\frac{W}{E}, E\frac{S}{N}, N\frac{E}{W}, W\frac{N}{S}$$

etc. For Fig. 1B the four $$\text{line } \frac{\text{out}}{\text{in}}$$

direction-combinations are the same, although the sequence is reversed because the movement is clockwise. The present machine provides for the four different direction-combinations to be automatically established during the copying in any order as required by the pattern contour, as later explained.

Where the proper $$\text{line } \frac{\text{out}}{\text{in}}$$

direction-combinations are established for 0° copying angles as above described, and the machine movements are in two mutually perpendicular paths, as in the present machine, and the tracer is of the type later described, any given direction-combination might be used through a copying range of about 90° either way from the corresponding 0° point. In the present machine, however, each of the four $$\text{line } \frac{\text{out}}{\text{in}}$$

direction-combinations is established at a point approximately 45° in advance of the 0° angle point which requires such combination, and is maintained to a point approximately 45° past the same 0° angle point. Thus referring to Figs. 1A, 1B, for example, the $$S\frac{W}{E}$$

direction-combination which is required at the indicated 0° angle points where the line movement is all in S direction is established at about the 45° angle point A1 of Fig. 1A and similarly at about the 45° angle point B2 of Fig. 1B, and is maintained through about 90° of copying movement to about the 45° point A2 of Fig. 1A and to about the 45° angle point B3 of Fig. 1B; and similarly for the other direction-combinations, as later described.

Fig. 2 diagrammatically shows the relative arrangement of the transmission mechanism and some of the control mechanism of the machine. The transmission mechanism provides supports 1 and 2 movable respectively in mutually perpendicular NS and WE paths, as indicated by the direction arrows associated with the supports. The supports are both driven from an electric motor 3 of any suitable substantially constant speed type through a feed rate changer 4, the rate changer driving the cage 5a of a mechanical differential device 5. The feed rate changer 4 may be of various types and preferably, although not necessarily, provides stepless rate change between minimum and maximum rates.

An output gear 5b, Fig. 2, of the differential 5 drives the NS support 1 through an electromagnetic reverser clutch device 6 and screw and nut means 1a. The reverser 6 includes a clutch member 6a positively connected for actuation of support 1 through the screw-nut means, and clutch members 6b, 6c positively driven from the differential gear 5b in N and S directions respectively and each having coils, not shown, alternatively energizable through an electric circuit later described for driving the member 6a in N or S directions. The screw-nut means 1a includes two nut elements carried by the support, as shown, which are relative axially adjustable to eliminate lost motion between the screw and support 1.

Similarly the output gear 5c, Fig. 2, of the differential drives the WE support 2 through an electromagnetic reverser clutch device 7 and screw-nut means 2a. The reverser 7 includes a clutch member 7a positively connected for actuation of support 2 through the screw-nut means, and clutch members 7b, 7c positively driven from the differential gear 5c in W and E directions respectively and each having coils, not shown, alternatively energizable through an electric circuit later described for driving the member 7a in W or E direction. The screw-nut means 2a includes two nut elements carried by the support, as shown, which are relatively axially adjustable to eliminate lost motion between the screw and support 2.

The relative ratio of the trains connecting the respective driving gears 5b, 5c, Fig. 2, to the supports 1 and 2 is such that equal speeds of the drive gears effect equal rates for the supports, but the driving and control arrangement provides that either support may have any rate of movement between zero and a maximum rate determined by the adjustment of rate changer 4, subject to the limitation that the sum of the support speeds is constant for any given rae changer adjustment.

Thus, the cage 5a of differential 5, Fig. 2, is unidirectionally driven from the constant speed motor 3, and the arrangement is such that equal unidirectional torques are applied by the cage to urge rotation of each of the gears 5b, 5c in the direction of cage rotation. The torque is applied to gears 5b, 5c through gears such as 5d pivoted on the cage 5a, in such manner that the sum of the speeds of gears 5b, 5c must equal twice the speed of the cage 5a unless one of the gears is rotated reversely by other power means, which is not contemplated in the present arrangement. It results that when the speed of one gear 5b or 5c is zero the other gear revolves at a maximum speed which is twice the speed of cage 5a, and vice versa, the maximum speed being established in part by the substantially constant speed of motor 3 and in part by the instant adjustment of rate changer 4. However, the driving arrangement is indifferent to the relative speeds of the output gears 5b, 5c, and within the limits stated either gear may have any speed provided the sum of the gear speeds equal twice the cage speeds, as stated. In the present machine the instant relative speeds of the gears, and of the supports 1 and 2 driven therethrough, are determined to suit the pattern configuration by tracer control of the instant relative value of resistance forces opposing the respective support trains, as will be described.

The machine includes a tracer 10 and a rotary cutting tool 12, Fig. 2. These parts are associated with the transmission and control mechanism in a particular manner, later described, but for convenience are shown in Fig. 2 spaced away from the transmission and in relatively larger scale. The tracer 10 includes a stylus or pattern contacting member 10a which is carried on an extended rod or shank 10b having a ball form pivot portion at 10c operating in a suitable ball form socket carried by a tracer frame or support 10d. At the shank end opposite the stylus there is a cone socket engaging a ball member 10e which simultaneously engages a similar cone socket on the lower end of a plunger 10f which is guided in the frame 10d. At the upper end the plunger 10f bears against a pivoted contactor bar 10g which is continuously urged by a spring 10h in a direction such that when the stylus 10a is free of the pattern it has a predetermined position both vertically and laterally in Fig. 2 relative to the frame 10d. Thus, the plunger 10f is guided in the tracer frame 10d in such manner that the ball 10e operates to center the stylus laterally, and the pivot 10c operates to limit the downward movement. The pivoted contact bar 10g carries a yieldable contactor member 10hh and associated therewith is an in contact 10i and an out contact 10k, each adjustably carried by the frame 10d.

The tracer in contact 10i is adjusted to such position that when the stylus is free of the pattern and in the above mentioned laterally central and downward position, the in contact is closed for in movement of supports 1 or 2, as later described. The out contact 10k is adjusted to such position that when the stylus is sufficiently shifted from the described in contact position, either upwardly in Fig. 1 or in any lateral direction, the in contact will be opened and the out contact 10k will be closed for out movement of supports 1 or 2, as later described. For reasons later explained, there preferably is a central position of the tracer stylus 10a, Fig. 2, intermediate between the in and out positions, in which both of the tracer contacts are open. For the present machine a satisfactory contact interrupting position may be effected, after the in contact is adjusted as above described, by the adjustment of the out contact as close to the in contact as may be practicable.

It will be understood that various other well-known types of tracers may be used to effect the in and out control results as later described and the use of any suitable type of tracer is contemplated.

In the present machine both the tracer 10 and the rotary cutter 12, Fig. 2, are fixed with the NS support 1 for bodily movement therewith in N or S direction, there being for such purpose suitable supports or brackets, not shown, operating to position the axis of the rotary cutter parallel with the axis of the tracer shank 10b when the tracer stylus is free of the pattern, that is to say when the stylus is in the position previously described, and with both axes vertical to both the NS and WE paths of movement. The brackets or supports mentioned also position the tracer and cutter with their axes spaced apart in W—E direction, as indicated in Fig. 2. The pattern and work members are fixed on the WE support 2 by the means of suitable clamps or fixtures, not shown, which provide for various W—E spacing thereof to suit different pattern and work dimensions, the brackets or supports for the tracer and cutter also providing for the relative anjustment of the W—E spacing thereof to suit various spacings of the pattern and work. The described arrangement is such that relative movements of supports 1 and 2 in the NS and WE paths permits the stylus 10a to follow the peripheral contour of any pattern within the capacity of the machine, and the cutter to correspondingly follow the work piece. Other arrangements of the parts might also be used for such purpose, however, and any suitable arrangement is contemplated. Suitable power transmission means, not shown, is provided for rotating the cutter 12 selectively at various speeds in any position of its WE adjustment and NS bodily movement.

The copying controller or first controller also includes a reversibly positive acting hydraulic brake pump 30, Fig. 2, of any suitable type that is positively driven through the WE reverser clutch member 7a, whereby the instant direction of delivery of liquid from the pump at all times corresponds to the instant direction of movement of support 2. A supply pump 31 is unidirectionally driven through the rate changer 4 from a point between the rate changer and the differential 5, and supplies liquid from any suitable reservoir, not shown, to the pump 30 through the one or the other of one-way valves 30a, 30b according to the instant direction of pump rotation. In either direction of pump 30 one of the valves operates to admit the liquid to the instant inlet port of the pump while the other valve closes to prevent liquid delivered from the instant outlet port from escaping back into the supply channel. An adjustable relief valve 31a of any suitable type establishes a predetermined pressure for the liquid supplied from pump 31.

Liquid from the brake pump 30 is directed to a valve 32, Fig. 2, which provides a shiftable plunger 32a and spaced inlet ports 32b, 32c respectively connected through closed channels to receive liquid from different ports of the pump 30, the valve having an outlet port 32d connected to a back pressure control valve means later described. The plunger 32a has oppositely tapered groove portions, as diagrammatically indicated, respectively adapted to variably throttle the flow of liquid from the different ports 32b, 32c. Thus, in the central plunger position, shown in Fig. 2, both of the ports 32b, 32c are closed from communication with the outlet port 32d, but as the plunger is shifted in the one or the other direction from the central position the liquid from the one port is decreasingly throttled while the other inlet port remains blocked. If either port 32b, 32c communicates with the outlet port 32d the other is closed but, except in the extreme positions of the plunger, the associated throttle portion acts to set up a back pressure opposing the escape of liquid through the communication port, the back pressure varying according to the instant position of the plunger and the plunger positions being controlled by the tracer through coils 32f, 32g as later described.

Similarly, a reversibly positive acting hydraulic brake pump 40, Fig. 2, is positively driven through the NS reverser clutch member 6a, whereby the instant direction of delivery of liquid from pump 40 at all times corresponds to the instant direction of movement of support 1. Pump 40 is supplied with liquid from the same pump 31 which, as described, supplies liquid to the pump 30. The pumps 30 and 40 are preferably of equal volumetric capacity, and since in the arrangement shown the speed of the supply pump 31 varies in accordance with the sum of the speeds of the two brake pumps 30, 40 it results that the pump 31, if of volumetric capacity suited to that of pumps 30, 40, might at all times provide sufficient liquid to exactly supply both of the pumps 30, 40 irrespective of their relative speeds. It is preferable, however, that pump 31 shall provide some excess of liquid to be by-passed through the relief valve 31a whereby such valve maintains a constant supply pressure on the pumps 30, 40. In either driven direction of pump 40 the liquid from pump 31 is supplied to the instant inlet port of pump 40 through the one or the other of one-way valves 40a, 40b while the other inlet valve closes to prevent the liquid from the instant outlet port from returning to the supply channel.

Liquid from the brake pump 40, Fig. 2, is directed to a valve 42 which provides a shiftable plunger 42a and spaced inlet ports 42b, 42c respectively connected to the different ports of the pump, the valve having an outlet port 42d connected to back pressure control means later described. Similarly to the plunger 32a, the plunger 42a has oppositely tapered groove portions, as diagrammatically indicated, respectively adapted to variably throttle the flow of liquid from the different ports 42b, 42c. In the central position of the plunger, shown in Fig. 2, both of the ports 42b, 42c are closed from communication with the outlet port 42d, but as the plunger is shifted in the one or the other direction from the central position the liquid from the one inlet port is decreasingly throttled while the other inlet port remains blocked. Thus if either port 42b, 42c communicates with the outlet port 42d the other is closed. Furthermore, except in the extreme positions of the plunger, the associated throttle portion acts to set up a back pressure opposing the escape of liquid through the communicating port, the back pressure varying according to the instant position of the plunger, and the plunger positions being tracer controlled by coils 42f, 42g as later described.

A path selecting control valve 50, Fig. 2, has a shiftable plunger 50a and inlet ports 50b, 50c connected through closed channels to receive liquid from the throttle valve outlet ports 32d and 42d respectively. Associated with the selecting valve 50 there is a line back pressure control valve 51 and an out-in back pressure control valve 52. The line back pressure valve 51 has an inlet port 51a which is connected through closed channels to receive liquid from either of two outlet ports 50d, 50e of the valve 50. The out-in back pressure valve 52 has an inlet port 52a which is connected through closed channels to receive liquid from either of two outlet ports 50f, 50g of the valve 50. The shiftable valve plunger 50a is provided with annular grooves, as shown, and the inlet ports 50b, 50c and outlet ports 50d, 50e, 50f, 50g are in such relationship to the plunger grooves that when the plunger is shifted to the left of the central position shown in Fig. 2 the line back pressure valve 51 receives any liquid delivered to valve 50 from NS brake pump 40 through the valve 42 and simultaneously the out-in back pressure valve 52 receives any liquid delivered to valve 50 from WE brake pump 30 through the valve 32. But when valve plunger 50a is shifted to the right from the central position shown in Fig. 2, the out-in back pressure valve 52 receives any liquid delivered to valve 50 from NS brake pump 40 through valve 42, and simultaneously the line back pressure valve 51 receives any liquid delivered to valve 50 from WE brake pump 30 through valve 32. The alternative left or right positions of the plunger 50a are controlled by coils 50h, 50i accordingly as the out-in control of tracer 18 is applied to the one or the other of the NS or WE paths of movement, as later described.

The line back pressure valve 51, Fig. 2, includes a throttle member 51aa fixed with a shank or plunger 51b, upon which is also fixed a piston member 51c operating in a suitable cylinder 51d. A spring 51e operates to continuously urge the throttle member 51aa toward closed position, the spring having an adjustable abutment 51f; but the throttle is simultaneously urged toward open position by any instant liquid pressure acting against the piston 51c. The piston 51c is continuously subjected to pressure of liquid from a positive delivery pump 53 which draws liquid from a suitable reservoir, not shown, the pump being driven from a point between the driver 3 and rate changer 4 and therefore of substantially constant volume delivery. Pump 53 is connected to the cylinder 51d through closed channels whereby the pumped liquid has no escape except through a torque responsive device, diagrammatically indicated at 54, Fig. 2, which operates to continuously oppose the escape of liquid with a back pressure that varies directly in accordance with the torque transmitter through device 54 to the differential cage 5a, since the torque responsive device drives the differential from the rate changer 4, as shown. The torque responsive device 54 may be of any suitable form but is, in this instance, constructed in the manner shown and described in Patent No. 2,355,554, issued August 8, 1944, and therefore will not here be described in detail. The effect of the described arrangement is to cause piston 51c to continuously oppose spring 51e with a pressure that varies directly according to the torque applied for driving the differential 5. The combined effect of spring 51e and piston 51c is for the valve to provide a line back pressure result which decreases as the driving torque on cage 5a increases, and vice versa, in a manner and for purposes later described. Liquid passing through the back pressure throttle 51aa is returned to a suitable reservoir, not shown, through a channel 51g.

The out-in back pressure valve 52, Fig. 2, provides a throttle member 52aa fixed on a shank 52b and continuously urged toward closed position by a spring 52c having an adjustable abutment 52d determinative of the back pressure effected by the throttle member. Spring 52c effects a substantially constant out-in back pressure result for back pressure valve 52, for purposes later described. Liquid from the out-in back pressure valve 52 may return to a reservoir, not shown, through a valve 56, Fig. 2, which includes an inlet port 56a, an outlet port 56b and a shiftable plunger 56c, the plunger having an annular groove, as shown, which in the plunger position shown in Fig. 2 provides free outlet for the liquid. The plunger is continuously urged to the free outlet position by a spring 56d, but may be shifted to the left by a coil 56e, whereby to close the outlet through the valve in a manner and for control purposes later described.

The described transmission and control mechanism of Fig. 2 is generally similar to a transmission and control mechanism illustrated and described in said Patent No. 2,493,828, as will later be further explained, except that in said patent the line control is limited to one path of movement and the out-in control is limited to the other path of movement. In the present machine either control may be applied to either path, as will appear.

The controls for the NS support 1 of Fig. 2 include the reverser clutch 6 and the shiftable valve 42, Figs. 2, 3, and a relay 70, Fig. 3 which operates for energizing the clutch 6 alternatively in N or S direction. Relay 70 includes N and S contacts 70a, 70b and a pivoted contactor 70c alternatively shiftable for N or S direction effect respectively by coils 70d, 70e. The contactor is yieldably retained in either closed contact position by detent means diagrammatically indicated at 70f. When the N or S contacts 70a, 70b are closed the corresponding N or S clutch members 6b, 6c are energized from a power source X, Fig. 3, whereby to drive the support 1, Fig. 2, in corresponding N or S direction. The N coil 70d of relay 70 and the N coil 42f of valve 42 will both be energized whenever an N circuit 72, Fig. 3, is energized and the S coil 70e of relay 70 and the S coil 42g of the valve 42 will both be energized whenever an S circuit 71, Fig. 3, is energized. Circuits 71 and 72 are alternatively energized to effect corresponding N or S movements of the NS support 1 as later described.

The controls for the WE support 2 of Fig. 2 include the reverser clutch 7 and shiftable valve 32, Figs. 2, 3 and a relay 73, Fig. 3, which operates for energizing the clutch 7 alternatively in W or E direction. Relay 73 includes W and E contacts 73a, 73b and a pivoted contactor 73c alternatively shiftable for W and E direction effect respectively by coils 73d, 73e. The contactor is yieldably retained in either closed contact position by detent means diagrammatically indicated at 73f. When the W or E contacts 73a, 73b are closed the respective W or E clutch members 7b, 7c are energized from the power source X, Fig. 3, to drive the WE support 2, Fig. 2, in corresponding W or E directions. The W coil 73d of relay 73 and the W coil 32f of valve 32 will both be energized whenever a W circuit 74, Fig. 3, is energized. The E coil 73e of relay 73 and the E coil 32g of valve 32 will both be energized whenever an E circuit 75, Fig. 3, is energized. Circuits 74 and 75 are alternatively energized to effect corresponding W or E movements of the WE support 2 as later described.

The controls provide means responsive to the instant copying movement directions, including a N—S direction responsive switch 80, Fig. 3, and W—E direction responsive switch 81, Fig. 3. These switches are shown, for convenience, in relatively enlarged scale at the upper left of Fig. 3, and are also shown in Fig. 3 in smaller scale in operating relationship to the respective NS and WE transmission.

The NS direction responsive switch 80, Fig. 3, includes an N contact 80a and an S contact 80b, together with a shiftable contactor element 80c fixed with a member 80d carried on a shaft portion 80e Figs. 2, 3 which is connected for rotation in N or S direction in accordance with the N or S direction of movement of support 1, Fig. 2, the member 80d being frictionally driven by the shaft. The arrangement is such that in either N or S direction of movement of the support the frictional drive of the member 80d from shaft portion 80e establishes and maintains a closed contact between the contactor member 80c and the corresponding N or S direction contact 80a or 80b of switch 80. The alternative closing of the N—S contacts of switch 80 operates for control purposes later described.

Similarly, the WE direction responsive switch 81, Fig. 3, includes a W contact 81a, an E contact 81b and a shiftable contactor element 81c fixed with a member 81d carried on the shaft portion 81e Figs. 2, 3 which is connected for rotation in W or E direction in accordance with the W or E direction of movement of the support 2, Fig. 2, the member 81d being frictionally driven by the shaft whereby in either W or E direction of movement of the support the frictional drive of member 81d from shaft 81e establishes and maintains a closed contact between the contactor member 81c and the corresponding W or E direction contact 81a, 81b of switch 81. The alternative closing of the W—E contacts of switch 81 operates for control purposes later described.

The controls also include means responsive to the instant angle of the copying movement as determined in this instance, by the instant relative speeds of supports 1 and 2, such means including a switch device 85, Fig. 3, a solenoid device 86, a NS generator 87 and a WE generator 88.

The solenoid device 86, Fig. 3, is operated from the generators 87, 88 and operates the switch 85 as later described. The device includes a pivoted lever 86a, a NS solenoid coil 86b, a WE solenoid coil 86c, and plungers 86d, 86e respectively for the different coils. The arrangement is such that the energizing of either coil 86b, 86c urges pivotal movement of the lever 86a, but any instant pivotal force exerted by the one coil is opposed by that of the other coil whereby the resultant pivotal force is zero when the coil forces are equal. Springs 86f, 86g respectively urge the different plungers 86d, 86e in the same direction as they are urged by the corresponding coils, the springs having adjustable abutments 86h, 86i respectively. The springs have corresponding characteristics and the abutments are normally adjusted to relative positions such that when the coil forces are equal, as above mentioned, the springs establish a central position of pivoted lever 86a, but if the currents through the coils are unequal, the unequal coil forces would, except as prevented as later described, rotate the pivoted lever 86a in the direction of the unbalanced force until springs 86f, 86g operate to balance the instant pivotal forces acting on the lever.

The switch device 85, Fig. 3, includes adjustably spaced contacts 85a, 85b and a contactor member 85c fixed on the pivoted lever 86a. In the mentioned central position of the pivoted lever both of the contacts 85a, 85b are open, but when the pivoted lever rotates in one or the other direction as described it operates to close one or the other of contacts 85a, 85b. The amount of coil force unbalance, above mentioned, required to close the different contacts is determined by the characteristics of the springs 86f, 86g and the position of adjustment of the contacts relative to the central position of the contactor member 85c. The control results of switch 85 will be later described.

Each of the NS and WE generators 87, 88, Fig. 3, includes field coils, not shown, which are respectively supplied with field current from circuits such as 87z, 88z. Rotatable armature coils not shown, of the respective NS and WE generators are connected as shown in Fig. 3 to supply the generated current to the corresponding NS and WE solenoid coils 86b, 86c. The armature coils of the NS and WE generators are connected with the respective NS and WE support transmissions, as to the shaft portions 80e, 81e for example, for rotation at maximum armature speed when the corresponding support is at maximum rate of movement, and at zero armature speed when the corresponding support has zero rate, the intermediate armature speeds varying in accordance with the support rates. In the arrangement shown the direction of armature rotation is reversed when the corresponding support movement is reversed, but this has no particular significance in the present instance since either direction of current will operate to urge the connected solenoid coil 86c or 86b in the direction to operate switch 85 as later described. The characteristics of generators 87, 88 are such as provide substantially equal force to the solenoid plungers 86d, 86e when the armatures are driven at equal speeds, that is to say when the NS or WE supports, Fig. 2, are moving at equal rates as, for example, at each of the 45° angle points A1, B1, etc., Figs. 1A, 1B. Thus during copying of any 45° pattern angle the switch contactor member 85c will stand in the central position previously described.

Referring to Fig. 3A, the described arrangement of switch 85, solenoid device 86 and generators 87, 88, Fig. 3, is such that during copying movement about any circular pattern, such, for example, as in Figs 1A, 1B, 5A, 5B the shiftable contactor 85c would, except for its abutment against contacts 85a, 85b, alternately move to extreme opposite positions such as indicated at 0°NS and 0°WE in Fig. 3A. Thus, for example, assuming that contactor 85c is in the central position at the 45° angle point A1, Fig. 1A, as above described, then as the copying of Fig. 1A proceeds in counterclockwise direction the contactor would, except as prevented by contact 85a, move upwardly in Fig. 3A to occupy a 0°S position at the time when the 0° angle is in S direction as shown at the left in Fig. 1A, since at such time the NS generator 87 is at maximum speed and the speed of the WE generator 88 is zero. As the copying continues the contactor would then move in the other direction to pass through the 45° central position at the copying point A2, Fig. 1A, since the generators are then at equal speeds. The contactor movement would then continue, except as prevented by contact 85b, for the contactor to occupy the 0°E position indicated in Fig. 3A at the time when the copying angle is 0° in E direction, as occurs at the bottom of Fig. 1A, since the WE generator 88 is then at maximum speed and the speed of the NS generator 87 is zero. Similarly the continued copying movement of Fig. 1A would except as prevented by the contacts 85a, 85b, move the contactor 85c back through the 45° central position to 0°N position, and then again through the 45° central position to the 0°W position, and then again return the contactor to the 45° central position when the copying returns to the starting point A1, etc. For the circular copying of Fig. 1B the movements of contactor 85c would be similar, but in reversed order, because the copying is in clockwise direction, and similarly for any circular copying.

The spaced contacts 85a, 85b, Fig. 3, prevent the described movement of the contactor member 85c to either the 0° copying position of Fig. 3A, as stated. Instead the generator currents operate to close the contact 85a shortly after the copying movement passes through any 45° angle points where the N or S speed is increasing, as occur at each of the points A1, A3 of Fig. 1A for example, and at each of the points B2, B4 of Fig. 1B, etc., since the movement of the contactor 85c is then from its central position toward the 0°NS position of Fig. 3A. Similarly the contact 85b is closed shortly after the copying movement passes through any 45° angle points where the W or E speed is increasing as occurs at each of the points A2, A4 of Fig. 1A and at each of the points B1, B3, of Fig. 1B, etc., since the movement of the contactor 85c is then from the central position toward the 0°WE position of Fig.

3A. The described alternative closing of the contacts 85a, 85b, Figs. 3, 3A, during copying movements operates for control results later explained.

The control mechanism further includes switch means 90, Fig. 3, controlled from the switch 85 through a relay 91, switch 90 having alternative left and right positions in Fig. 3 determinative of which of the NS or WE supports 1 and 2, Fig. 2, will be subjected to the out-in control of tracer 10, and simultaneously determinative of a line control result for the other support, as later explained. Associated with the switch 90 there is a line-direction control switch means 92 which, in either position of the switch 90, operates to determine the instant line direction for the line controlled support, as later explained. Also associated with switch 90 there is an out-in direction control switch means 93 which operates to determine the instant out and in directions for the out-in controlled support, as later explained.

The switch 90, Fig. 3, includes two spaced sets of N, S, W, E contacts, as shown, the left-hand set of contacts being associated with a pair of shiftable line contactor members 90a, 90b which may be alternatively energized serially through the line direction switch 92 as later explained; the right-hand set of contacts of switch 90 being associated with a pair of shiftable contactor members 90c, 90d which may be alternatively energized serially through the out or in contacts of tracer 10 and the out-in direction switch 93, as later explained.

The four shiftable contactor members 90a, 90b, 90c, 90d of switch 90 Fig. 3 are connected together and may be simultaneously shifted to the left in Fig. 3 upon the energizing of a coil 90e through the relay 91, and in such case the contactor members 90a, 90b are respectively connected through the E and W elements of the left-hand set of switch contacts with the E circuit 75 and the W circuit 74, whereby to establish a line control from switch 92 for the WE support 2, Fig. 2. Simultaneously, the shiftable contactor members 90c, 90d, of switch 90 are respectively connected through the N and S elements of the right-hand set of switch contacts with the N circuit 72 and the S circuit 71, whereby to establish an out-in control from switch 93 for the NS support 1, Fig. 2.

Alternatively, the four shiftable contactor members of switch 90 may be simultaneously shifted to the right in Fig. 3 upon energizing a coil 90f through the relay 91 and in such case the contactor members 90a, 90b are respectively connected through the N and S elements of the left-hand set of switch contacts with the N circuit 72 and the S circuit 71 whereby to establish a line control from switch 92 for the NS support 1, Fig. 2. Simultaneously the contactor elements 90c, 90d are respectively connected with the E circuit 75 and the W circuit 74, whereby to establish an out-in control from switch 93 for the WE support 2, Fig. 2.

The switch 85, Fig. 3, operates to control the described alternative left or right positions of switch 90 through the relay 91 as follows: The relay 91 includes spaced contacts 91a, 91b, a pivoted contactor member 91c, and coils 91d, 91e adapted to shift the contactor to close the contacts 91a and 91b respectively, there being means diagrammatically indicated at 91f for yieldably retaining the contactor 91c in either shifted position. The relay coils 91d and 91e may be energized through a circuit 95—96, Fig. 3, respectively through the contacts 85a, 85b of the switch 85. The switch coils 90e, 90f of switch 90, Fig. 3, may be energized through a circuit 97, 98, Fig. 3, respectively through the relay contacts 91b, 91a. The arrangement operates to effect the described right-hand position of the contactor elements of switch 90, whenever the contact 85a of switch 85 is closed and to then retain switch 90 in such position until the closing of the other contact 85b of switch 85. Similarly, upon the closing of the contact 85b of switch 85 the contactor elements of switch 90 are shifted to the described left-hand position and then retained in such position until the other switch contact 85a is closed.

The shiftable control valve 50, Figs. 2, 3, previously described, is also controlled from the relay 91, Fig. 3. Thus the coil 50h of valve 50 is connected, as shown in Fig. 3, to be energized simultaneously with the coil 90f of switch 90 whereby to connect the line back pressure valve 51, Fig. 2, to receive the flow of liquid from the control valve 42 of the NS support control means, and simultaneously to connect the out-in back pressure valve 52, Figs. 2, 3, to receive the liquid from control valve 32 of the WE support control means, which is the proper instant connection, since the NS support 1 is then connected through switch 90 for line control, and the WE support 2 for out-in control, as previously described. Similarly when the coil 90e of switch 90 is energized as described the coil 50i of valve 50 is simultaneously energized whereby to connect the line back pressure valve 51 to receive liquid from the WE control valve 32 and simultaneously connect the out-in back pressure valve 52 to receive liquid from the NS support control valve 42.

The line direction control switch 92, Fig. 3, is controlled in part from the switch 85 and in part from the direction switches 80, 81, as later described, whereby to establish the proper line movement direction shortly after the copying passes any 45° angles such as A1, B1, etc., Figs. 1A, 1B, etc. The switch 92 includes spaced contacts 92a, 92b respectively connected to the contactor elements 90a, 90b of switch 90, a pivoted contactor member 92c shiftable in opposite direction respectively closing the contacts 92a, 92b, means diagrammatically indicated at 92d operable for retaining the shiftable contactor 92c in either closed-contact position, and coils 92e, 92f, 92g, 92h which are energized one at a time, as later described, for shifting contactor 92c. If the contact 92a of switch 92 is closed while the switch 90 is in the described right-hand position, Fig. 3, the contact 92a completes a circuit 100—101 through the N control circuit 72, Fig. 3, whereby to energize clutch 6 and to position valve 42, Figs. 2, 3 to effect line movement of the NS support 1 in N direction. If alternatively the contact 92b of switch 92 is closed during such right-hand position of switch 90, it completes the circuit 100—101 through the S control circuit 71 whereby to energize clutch 6 and position valve 42 for line movement in S direction. Similarly, if contact 92a is closed while switch 90 is in its described left-hand position the contact 92a completes the circuit 100—101 through the E control circuit 75, Fig. 3, whereby to energize clutch 7 and position valve 32 to effect line controlled movement in E direction, but if the contact 92b is closed during such left-hand position of switch 90 the circuit 100—101 is completed through the W control circuit 74 to effect line control in W direction.

From the above description it will be seen that in the operation of switches 90, 92, Fig. 3, as described, the line control may be applied to either the NS clutch-valve pair 6, 42 or the WE clutch-valve pair 7, 32 for effecting the line movement in either direction in either path, as is required as previously pointed out for the copying movements of Figs. 1, 1A, 1B, etc. In each line direction connection the control of valve 50 as described operates to connect the line back pressure valve 51, Fig. 2 to continuously oppose the instant line movement.

The out-in direction control switch 93, Fig. 3, similarly to the switch 92, is controlled in part from the switch 85 and in part from the direction switches 80, 81, whereby to establish the out and in control result of tracer 10 in proper directions shortly after the copying passes any 45° angle point such as A1, B1, etc., Figs. 1A, 1B, etc., as later described. The switch 93 includes two sets of spaced contacts including a left-hand pair 93a, 93b and a right-hand pair 93c, 93d. The contacts 93a and 93d are both connected, as shown, to the shiftable contactor 90d of the switch 90, Fig. 3, and the contacts 93b, 93c, are both connected to the shiftable contactor 90c of the switch 90. Associated with left-hand pair of contacts 93a, 93b there is a pivoted out contactor member 93e which is connected to be energized through the out contact 10k of tracer 10 and is oppositely shiftable to alternatively close the different switch contacts 93a, 93b. Associated with the right-hand pair of contacts there is an in contactor member 93f connected to be energized through the in contact 10i of tracer 10 and oppositely shiftable to alternatively close the contacts 93c, 93d. The out and in contactor members 93e and 93f are connected together, as shown, to be simultaneously shifted from one or another of coils 93h, 93i, 93j, 93k, which are energized one at a time, as later described, both the contactors being yieldably retained in either shifted position by means diagrammatically indicated at 93g. It will be seen that whenever the contactors 93e, 93f are shifted to the right in Fig. 3 the shiftable contactor 90c of switch 90 will then be energized whenever the tracer out contact 10k is energized and the shiftable contactor 90d of switch 90 will then be energized whenever the tracer in contact 10i is energized. But whenever the pair of contactors 93e, 93f is shifted to the left in Fig. 3 the contactors 90c and 90d of switch 90 will be energized respectively through the tracer in contact 10i and the tracer out contact 10k.

The described arrangement is such that when the switch 90 is shifted to the right in Fig. 3, by the closing of switch contact 85a as has been described, and the switch 93 is also shifted to the right, as later described, the out contact 10k of tracer 10 is connected to the E control circuit 75 through the shiftable contactors 93e and 90c, and the in contact 10i of tracer 10 is connected to the W control circuit 74 through the shiftable contactors 93f, 90d; whereby the out and in movement directions will be E and W respectively; but if, alternatively, the switch 93 is shifted to the left while the switch 90 is shifted to the right position as stated, the out and in control directions will be W and E respectively. Similarly, when switch 90 is shifted to the left in Fig. 3, by the closing of switch contact 85b as has been described, and the switch 93 is shifted to the right as is later described, the tracer out contact is connected to the N control circuit 72 and the tracer in contact 10i is connected to the S control circuit 71 whereby the out and in movement directions will be N and S respectively, but if alternatively switch 93 is shifted to the left while switch 90 is shifted to left position as stated, the out and in control directions are S and N respectively.

It will be seen that in the described operation of switches 90, 93, Fig. 3, the out control result of tracer 10 may be connected for effecting out movement in either N, S, W or E direction and simultaneously the in control of tracer 10 is connected for the other direction in the same NS or WE path.

The described direction responsive switches 80, 81 and angle responsive switch 85, Fig. 3, collectively control the machine whereby to effect the one or the other of the four $$\text{line } \frac{\text{out}}{\text{in}}$$

direction combinations $$W\frac{N}{S}, S\frac{W}{E}, E\frac{S}{N}, N\frac{E}{W}$$

previously referred to, in any order as is required by the instant copying. Thus for the circular copying of Figs. 1A, 1B, for example, the $$S\frac{W}{E}$$

direction combination is effected as later described shortly after passing either of 45° angle points such as A1 or B2; the $$E\frac{S}{N}$$

combination is effected shortly after passing either of 45° angle points such as A2, or B1; the $$N\frac{E}{W}$$

combination is effected shortly after passing either of 45° angle points such as A3 or B4, and the $$W\frac{N}{S}$$

combination is effected shortly after passing either of 45° angle points such as A4 or B3; and referring to Fig. 1, for example, it will be seen that where such results are effected at the 45° angle points the copying will proceed with a proper $$\text{line } \frac{\text{out}}{\text{in}}$$

direction combination throughout any irregular pattern periphery, as well as for the circular copying of Figs. 1A, 1B.

The operation of the control mechanism for automatically effecting the required changes of $$\text{line } \frac{\text{out}}{\text{in}}$$

combinations as just described is as follows: At each 45° angle point A1, B1, etc., Figs. 1A, 1B the switch 85 is in the central position, as previously described, since the rates of NS and WE supports are equal. But as the copying angle increases past the 45° angle the rate of the one support is relatively greater than the other, whereby to close the one or the other switch contact 85a or 85b, Fig. 3 as previously described. At the same time that contact 85a or 85b closes, the instant closed contacts of direction switches 80, 81 will complete a closed circuit 105—96 or 104—96 Fig. 3 through one only of the shifter coils of switch 92 and also through one only of the shifter coils of switch 93, the circuit through each of the other coils of each of the switches 92, 93 being open either at the switch 85 or at one of the switches 80, 81. Furthermore, as previously described, at each closing of either of the switch contacts 85a, 85b following any of the 45° angle points, such as A1, B1, etc. of Figs. 1A, 1B, the switch 90 is shifted in manner previously described. It results that shortly after passing any of the 45° angle points A1, B1, etc., Figs. 1A, 1B each of the three switches 90, 92, 93 is simultaneously shifted if such shifting is required, and the combined result is to effect the proper line, out and in control directions for any new $$\text{line } \frac{\text{out}}{\text{in}}$$

direction combination required by the pattern.

Thus, for example, the $$S\frac{W}{E}$$

combination is required following any 45° angle point such as A1, or B2, Figs. 1A, 1B, as has been stated. In both cases the switch contact 85a closes as previously described shortly after the copying passes either such 45° angle point, since the S rate then predominates over the rate of the other movement. The closing of contact 85a operates to shift switch 90 to the right in Fig. 3 and to thereby effect a line control for the NS path and an out-in control for the WE path as is required at both the points A1 and B2, assuming that the copying angle continues to change in the same direction. At point A1 the support movement is SW whereby only the S and W direction switch contacts 80b, 81a are closed, but only the S contact 80b is available to energize any shifter coil of either switch 92, 93, since the W contact 81a completes its circuit only through switch contact 85b, which is then open. Similarly, at point B2 the support movement is SE whereby only the S and E direction switch contacts 80b, 81b are closed but in this case also, only the S contact 80b is available to energize any shifter coil of either switch 92, 93 since the E contact of switch 81 also completes its circuit only through the switch contact 85b, which is then open. It results that at either of the points A1, B1 the closing of the contact 85a of switch 85 completes a circuit 105—96 through the S contact 80b and through both of the shifter coils 92g and 93h, whereby the switch 92 is shifted to the right and switch 93 to the left simultaneously with the shifting of switch 90 to the right, thereby establishing the desired $$\text{line } \frac{\text{out}}{\text{in}}$$

direction relationship $$S\frac{W}{E}$$

as previously described.

Similarly, the $$\text{line } \frac{\text{out}}{\text{in}}$$

direction relationship $$E\frac{S}{N}$$

is established shortly following any 45° angle point such as A2, B1, Figs. 1A, 1B. In each instance the closing of switch contact 85b operates to shift the switch 90 to the left and simultaneously a closed E direction switch contact 81b closes a circuit 104—96 through both of the shifter coils 92f and 93i whereby to establish the $$\text{line } \frac{\text{out}}{\text{in}}$$

relationship just stated.

Also, the $$\text{line } \frac{\text{out}}{\text{in}}$$

direction relationship $$N\frac{E}{W}$$

is established shortly following any 45° angle points such as A3, B4, Figs. 1A, 1B. In each instance the closing of switch contact 85a operates to shift the switch 90 to the right and simultaneously a closed N direction switch contact 80a closes the circuit 105—96 through both of the shifter coils 92e, 93j whereby to establish the $$\text{line } \frac{\text{out}}{\text{in}}$$

relationship stated.

Also the $$\text{line } \frac{\text{out}}{\text{in}}$$

direction relationship $$W\frac{N}{S}$$

is established shortly following any 45° angle points such as A4, B3 of Figs. 1A, 1B. In each instance the closing of switch contact 85b operates to shift the switch 90 to the left, and simultaneously a closed W direction switch contact 81a closes the circuit 104—96 through both of the switch coils 92h, 93k whereby to establish the $$\text{line } \frac{\text{out}}{\text{in}}$$

relationship stated.

It will be seen that the angle-responsive switch 85 acts as a trip device determinative of the copying angle points at which the $$\text{line } \frac{\text{out}}{\text{in}}$$

relationship shall be changed, and also acts in combination with the direction-responsive switch means 80, 81 to fully determine what change shall be made.

When a change of $$\text{line } \frac{\text{out}}{\text{in}}$$

relationship has been effected, as described, the same combination will continue to be operative until the copying passes through another 45° angle of such nature as to close the other of the contacts 85a or 85b as the case may be. Thus referring to Fig. 1C, for example: When the contact 85a closes shortly after passing a 45° angle point such as A1, Figs. 1A, 1C, the $$\text{line } \frac{\text{out}}{\text{in}}$$

direction relationship $$S\frac{W}{E}$$

is established as previously described. Subsequently a considerable range of angles including some 0° angles and some 45° angles such as occur in either clockwise or counter-clockwise direction may be copied as shown in Fig. 1C without change of the $$S\frac{W}{E}$$

relationship, provided the copying does not pass through a point where the W or E rate of movement is sufficiently greater than the S rate of movement to effect the closing of the contact 85b. But if the pattern angle changes sufficiently, as is indicated at the bottom of Fig. 1C, a change of the $$\text{line }\frac{\text{out}}{\text{in}}$$

relationship will take place to suit the change of pattern angle.

A particular $$\text{line }\frac{\text{out}}{\text{in}}$$

relationship, once established, may operate through considerable changes of angular direction, as pointed out for Fig. 1C, but for some copying operations only a small change of the copying angle might, unless prevented, effect another change of the $$\text{line }\frac{\text{out}}{\text{in}}$$

relationship. Thus, referring to Fig. 1D, for example, where a change to $$S\frac{W}{E}$$

direction relationship is made by the closing of the contact 85a shortly after passing a 45° angle such as occurs at point A1, Figs. 1A, 1D, only a small change of pattern angle may cause the copying to proceed through another 45° angle such as occurs at point B3 of Figs. 1B and 1D, whereby to close the contact 85b and effect the $$W\frac{N}{S}$$

combination. It is undesirable for various reasons that changes of $$\text{line }\frac{\text{out}}{\text{in}}$$

direction relationship should follow one another more often than is necessary. The adjustment of the contacts 85a, 85b of switch 85, Figs. 3, 3A, relative to the 45° position of contactor 85c, determines the minimum change of pattern angle or copying direction, that is, how far the copying proceeds past the 45° angle points to effect a new $$\text{line }\frac{\text{out}}{\text{in}}$$

relationship. The contactor 85c should have sufficient movement between the contacts 85a, 85b that the trip mechanism does not operate repeatedly upon slight changes of angle alternately in opposite direction when the copying proceeds in a generally 45° angle direction as in Fig. 1D.

For some abrupt changes of pattern angle, change of $$\text{line }\frac{\text{out}}{\text{in}}$$

relationship operates somewhat differently than previously described. Thus, referring to Fig. 1E for example, if the pattern angle changes abruptly to require straight W movement at a time when the instant $$\text{line }\frac{\text{out}}{\text{in}}$$

relationship is $$S\frac{W}{E}$$

as shown in Fig. 1E, a correspondingly abrupt change is required to effect a $$W\frac{N}{S}$$

relationship, since the required W movement corresponds to a 0°W angle. The initial effect when the tracer stylus contacts the W surface in the operation of Fig. 1E is to displace the tracer stylus laterally whereby to close the tracer out contact and maintain it in closed out position, which operates to effect W movement for the instant condition. Under such conditions the instant rate of the line movement in S direction is decelerated while the rate of the instant out movement in W direction simultaneously accelerates, as later explained. Such S deceleration, W acceleration will proceed somewhat past the point where the instant W and S movements are equal, that is to say somewhat past the equivalent of 45° angle B3, Fig. 1B, and it then occurs that the increases of the W rate has moved the contactor 85c of switch 85 to close the contact 85b, Figs. 3 and 3A, whereby to effect the required $$W\frac{N}{S}$$

direction relationship in the manner previously described, and the copying of Fig. 1E then proceeds in a normal manner for a 0°W angle. Other abrupt changes of pattern angle, either in out or in direction similarly effect the required change of $$\text{line }\frac{\text{out}}{\text{in}}$$

relationship.

The control means operates to effect various $$\text{line }\frac{\text{out}}{\text{in}}$$

direction combinations in a manner described, and throughout the operation of each such combination the tracer 10 controls the transmission mechanism for effecting the copying result in a manner which is essentially the same as that fully explained for a similar tracer and transmission mechanism in the previously mentioned Patent No. 2,493,828, except that in the present machine the tracer control is alternatively applied as required by the pattern to either of two paths of movement in a manner to effect out control in any of four directions with simultaneous in control in the opposite direction, as has been explained. The transmission control therefore will be here only briefly explained, as follows:

The driving motor 3, Fig. 2, operates through the differential 5 to maintain the sum of the speeds of supports 1 and 2 at a constant value determined by the adjustment of rate changer 4, as has been explained. The torque controlled line throttle valve 51, Fig. 2, operates to maintain a sufficient back pressure, opposing the brake pump 30 or 40 of the instant line controlled transmission, for the motor 3 to accelerate the instant out-in controlled transmission at a predetermined minimum rate of acceleration against the maximum resistance which can operate to oppose either out or in direction movement, including any cutting load resistance which is within the rated capacity of the machine, and including the resistance of the out-in back pressure valve 52, Figs. 2, 3, but not including the tracer controlled resistance next mentioned. The tracer 10 may, however, control the clutch-valve pair 6, 42 or 7, 32, Figs. 2, 3, of the instant out-in controlled transmission to effect a sufficient resistance, opposing movement of the instant out-in controlled transmission, that the motor 3 is forced to accelerate the rate of movement of the instant line transmission against the maximum resistance which can oppose the line direction movement, including the line cutting load and including the resistance imposed by the line back pressure valve 51 as described. During the line acceleration result, however, the back pressure resistance effect of line back pressure valve 51 is automatically reduced by the control from torque device 54.

The combined effect of such back pressure control of resistance to line movement and tracer control of resistance to out-in movement operates in each of the various $$\text{line } \frac{\text{out}}{\text{in}}$$

combinations to maintain a path of stylus and cutter movements to follow the form of the pattern, in exactly the same manner in which the line and out-in controls operate in said Patent No. 2,493,828, for the same result.

Thus the effect, both in the said Patent No. 2,493,828, and in the present application, is to establish an unbalance of the resistance forces respectively opposing line and out-in movement at all times when the relative line and out-in speeds are such that the copying movement does not conform to the pattern, such resistance unbalance operating for acceleration of whichever movement is relatively too slow and simultaneously for deceleration of whichever movement is relatively too fast, until such time as the controls effect a path of tool movement conforming to the configuration of the pattern. At such time the tracer controlled resistance opposing the out-in transmission balances the resistance opposing the line movement and there is then no further change of relative line and out-in speeds.

As in said Patent No. 2,493,828, the direction-correction operation just described is effected by a primary control of valve 32 or 42 of the instant in-out controlled transmission, the controlled valve operating, under the control of the tracer, in conjunction with the corresponding brake-pump 30 or 40 to resist the energy of momentum of decelerated parts to assist in the direction-correction operation. Thus, as fully explained in said patent, any initial overrun of the tool such as normally occurs whenever there is a change of pattern direction is reduced to a minimum value, and any initial in-out oscillations or jiggles in the tool path such as normally occur due to alternate acceleration and deceleration cycles, whenever there is such overrun are immediately stabilized in a form of minimum amplitude and thereafter progressively reduced in amplitude to effect a substantially straight-path result in a minimum of time. In the meantime the tracer control of the out-in controlled valve 32 or 42 as the case may be operates supplementally to stabilize the position of the valve at a point where the tapered-groove portion thereof co-acts with the valve ports to throttle the liquid passing through the valve, whereby to effect a back pressure result operative to exactly balance the line back pressure, thereby to maintain a straight-path movement without assistance from the tracer until such time as the pattern angle again changes.

Figures 4, 4A:
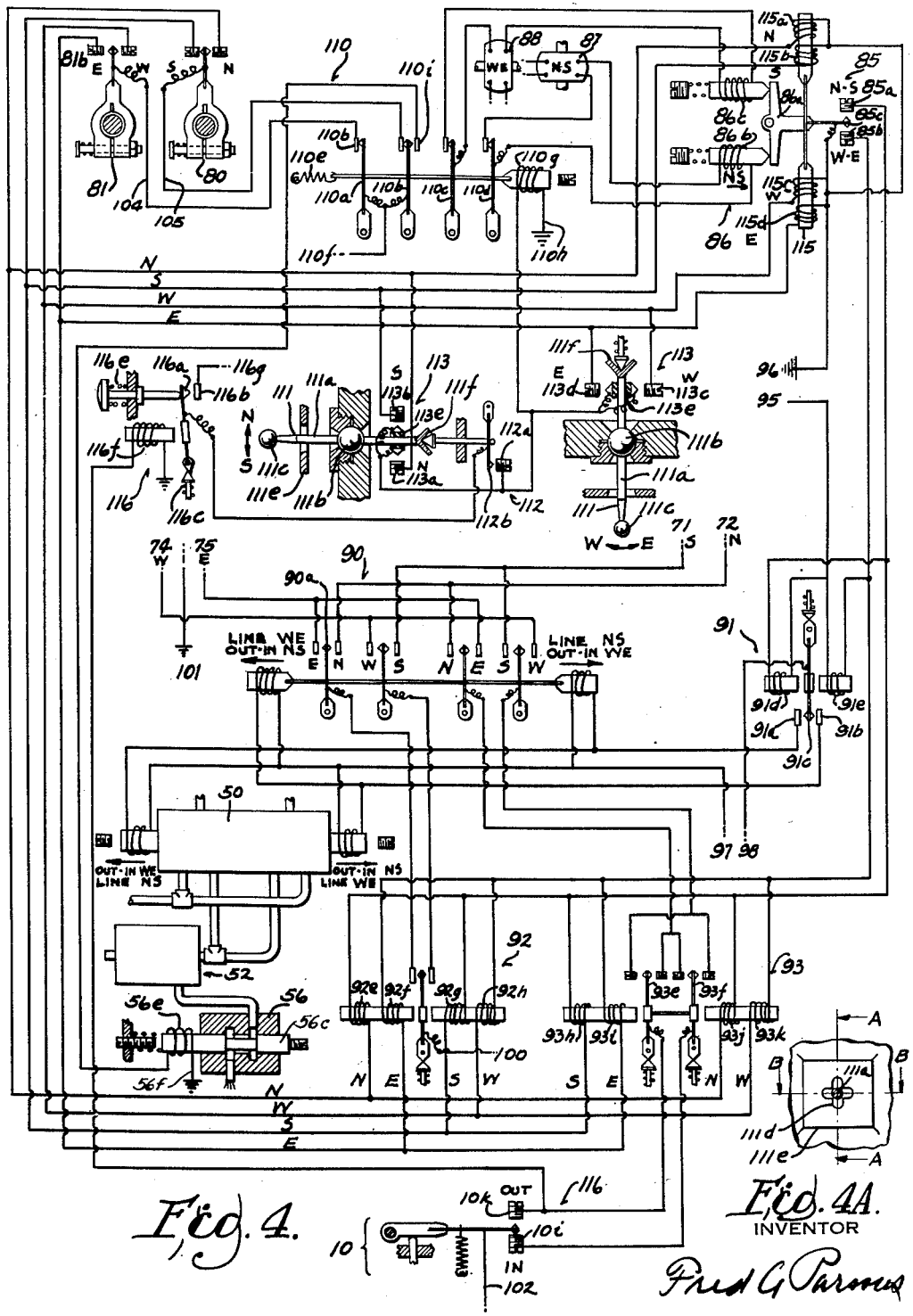
Figure 4 is a diagram showing manual control means, and its operating relationship to the transmission and control mechanism of the machine of Figs. 2, 3.
Figure 4A is a detailed plan view of a manual control lever and its cooperating slotted guide plate shown in longitudinal section in Fig. 4.

The machine is provided with a second controller or manual direction-control means, as shown in Figs. 4, 4A which is operable for effecting movement of supports 1, 2, Fig. 2, in either direction of their NS and WE paths. The manual control means includes a switch 110, a manually operable lever 111, switches 112, 113 associated with lever 111, a solenoid device 115 associated with the switch 85, a switch 116, and the valve 56, Figs. 2, 4.

The switch 110, Fig. 4, includes two pairs of pivoted contactors 110a, 110b, and 110c, 110d, which are connected together and continuously urged by a spring 110e to the left position shown in Fig. 4, whereby to close four associated contacts, as shown. In such switch position the contactor pair 110a, 110b operates through the associated contacts to energize the respective circuits 104, 105 from a source 110f, whereby to energize the shiftable contactors of the direction switches 80, 81 for automatic copying as previously described. Also, in such switch positions the contactor pair 110c, 110d operates through the associated contacts to close the respective armature circuit of WE generator 88 and NS generator 87 whereby the solenoid device 86 is energized from the generators for operation of the automatic copying as previously described. A coil 110g may, however, be energized to shift the contactors of switch 110 to the right, whereby to open the four normally closed contacts and simultaneously to close a contact 110i, thereby completing a circuit 110f—56f through the coil 56e of valve 56. This operates to close the valve 56 for the manual control purposes as later described.

The lever 111 Figs. 4, 4A, is shiftable for determining the direction of the manually controlled support movements. For convenience the lever 111 and certain associated parts are twice shown in Fig. 4, the left and right views being sections taken respectively along lines A—A and B—B of Fig. 4A. The lever includes a shank or rod portion 111a, having a universal mounting at 111b whereby an exposed handle or grip portion 111c may be shifted selectively in any of the N—S—W—E directions of movement of supports 1 and 2, Fig. 2; as is indicated by the direction arrows associated with the hand grip portion 111c in Fig. 4. The lever is prevented from movement in other directions by the engagement of the shank with a slotted aperture 111d, Fig. 4A, of a fixed plate member 111e. A suitable spring operated detent means, diagrammatically indicated at 111f operates for continuously urging the lever to the central position of its movement and yieldably retaining it in such position.

The switch 112, Fig. 4 is associated with the lever 111 and provides a contact 112a and a pivoted contactor 112b which is connected, as shown, for switch 112 to be open whenever the handle 111c is in its central position, and for switch 112 to be closed whenever the handle 111c is shifted to any of its N—S—W—E direction positions.

The switch 113, Fig. 4, is also associated with the lever 111. Switch 113 includes N—S—W—E contacts 113a, 113b, 113c, 113d which are connected respectively, as shown, to the N—S—W and E coils 92e, 92g, 92h, 92f of the line-direction control switch 92, also to the N—S—W and E coils 93j, 93h, 93k, 93i of the out-in direction control switch 93, and also to N—S—W and E solenoid coils 115a, 115b, 115c, 115d of the solenoid device 115. The switch 113 includes a contactor 113e carried on the shank of the lever 111 and adapted to close the respective N—S—W—E contacts one at a time accordingly as the lever 111 is shifted in corresponding N—S—W or E direction, such shifting simultaneously closing the switch 112, as described.

The solenoid device 115, Fig. 4, includes the N—S—W—E coils 115a, 115b, 115c, 115d, having cores arranged and connected to the lever 86a, as shown, in such manner that the energizing of either the N or S coil operates to close the NS contact 85a of the switch 85, while the energizing of either the W or E coil operates to close the WE contact 85b.

The switch 116, Fig. 4, includes a pivoted contactor 116a, a contact 116b, and a detent device 116c which is operable to yieldably retain the contactor in either open or closed-contact position. A push-button device 116e is continuously spring urged to the position shown in Fig. 4 but may be manually urged to the right to shift the contactor 116a to its closed-contact positions. If the push-button device is in the released position, as shown, the contactor may be shifted to its open-contact position by the operation of a coil 116f. The coil 116f is energized from source 102 through the tracer out contact 10k whenever the out contact is closed, that is to say whenever the tracer stylus contacts the pattern.

The operation of the described manual control devices is as follows:

When the push-button 116e is depressed, whereby to close the contact 116b of switch 116, the contactor 112b of switch 112 is then energized from a source 116g. If then the handle 111c is shifted to its N, S, W or E position the switch 112 is closed whereby to complete a circuit 116g—110h through the coil 110g and thereby shift the switch 110 to the right in Fig. 4. This operates to interrupt the control effect of each of the direction switches 80, 81 and to interrupt the circuits of both of the generators 87, 88 which normally control the position of the switch 85.

Simultaneously with such shift of switch 110 to the right, the closed N, S, W, or E contact of switch 113 is energized from the source 116g through the closed switch 112, whereby to energize the corresponding N, S, W, or E coils of each of the line and out-in direction switches 92, 93; and also to energize the corresponding coil of the solenoid device 115. A circuit 116g—96 operates through the last mentioned coil to instantly shift the switch 85 to close the corresponding NS contact 85a, or WE contact 85b. As soon as such contact 85a or 85b is closed a circuit 116g—96 is completed through the closed contact just mentioned and each of the energized coils of switches 92, 93; and simultaneously therewith a circuit 95—96 is completed through the closed contact 85a or 85b and the corresponding coil 91d or 91e or the relay 91. The shift of switch 110 to the right, as above described, also operates to complete a circuit 110f—56f through the contact 110i and the coil 56e, whereby to close the outlet of liquid through the valve 56.

The shift of value 56 as just described operates to immediately stop any previous movement of supports 1 or 2 in either the out or in direction as normally determined by the tracer 10, and to immediately establish support movement in the direction corresponding to the direction in which the handle 111c was shifted as described.

Thus assuming, for example, that the handle 111c was shifted in E direction; the result is to complete a circuit through the E coil 115d of solenoid device 115 whereby to close the contact 85b of switch 85. This energizes coil 91e of relay 91 whereby to shift the switch 90 to its left-hand position and simultaneously to shift the valve 50 to its right-hand position, as previously described for the automatic copying result. At the same time the circuits through the E coils 92f and 93i of the switches 92, 93 operate to effect the left-hand position of both these switches. In such positions of the control devices, that is to say with each of the switches 90, 92, 93 in left-hand position and the valve 50 in right-hand position, the WE reverser clutch 7 and control valve 32, Fig. 2 are energized for E direction and the WE brake-pump 30, Fig. 2, delivers its liquid through the line back pressure control valve 51; also NS reverser clutch 6 and control valve 42 are energized in such manner that the out and in directions as determined by tracer 10 would normally be respectively in S and N direction, although neither of such N or S movements can occur since the coil 56e has shifted the plunger of valve 56 to the left-hand position as described, thereby preventing any outlet of fluid from the NS brake-pump 42.

It results that in the mentioned E position of the handle 111c the WE support 2 will immediately be forced to move in E direction at maximum rate, as determined by the adjustment position of rate changer 4. Similarly, if the handle 111c had been shifted, instead, to its N, S, or W positions the resulting movement would have been in corresponding N, S, or W direction.

The operation above described includes depressing the push-button 116, Fig. 4, for energizing the contactor 112b but that is necessary only at such times as the manual control is used to move the tracer and tool away from the pattern and work for interruption of the pattern-controlled copying. Thus during pattern-controlled copying the coil 116f of switch 116 will be energized whenever the tracer out contact 10k is closed, and unless the push-button is depressed as stated it might result that a closed tracer out contact would operate to shift the switch 116 to open position, thereby interrupting the manual control as later described. But when the manually controlled movements are outside the zone of stylus contact with the pattern the out contact 10k remains open, and push-button 116 may be released since the detent 116c will then maintain the switch 116 closed for manual direction-control in any N, S, W or E direction according to the shifting of lever 111.

The described arrangement is operative to interrupt the manual control effect of the lever 111 and establish the automatic pattern control whenever the movement of the supports 1 and 2 under manual control brings the tracer stylus within a zone normally controlled by any instant pattern. Thus, a contact of the stylus with the pattern during manually controlled movement operates to close the tracer contact 10k, whereby to energize the coil 116f and thereby to open the switch 116 whereby all of the described manual control devices energized therethrough are immediately de-energized.

An immediate result of the opening of switch 116 is to de-energize the coil 110g of switch 110 whereby the switch returns to its left-hand position and de-energizes the coil 56e of valve 56, and the valve then returns to its position, as shown in Fig. 4, establishing only a normal resistance to the out-in movement as determined by the tracer-control of the control valve 32 or 42 of the instant out-in controlled support in the manner described for the automatic copying.

As to the immediate positions of the switches 85, 90, 92, 93 and of relay 91, the described return of the switch 110 to its left-hand position upon contact of the pattern by the stylus will have no effect, for the reason that for each of the N, S, W, or E movements, as established by the manual control, the described manual control devices operate to effect the same positioning of the switches and relay just mentioned as would occur during pattern controlled movements in the same direction at the same relative support speeds. But somewhat after the tracer has contacted the pattern whereby to establish the pattern control of the movements there will be such changes of $$\text{line} \frac{\text{out}}{\text{in}}$$

direction-combinations as are required for the automatic copying, irrespective of the direction from which the pattern is approached by the manual control.

Thus considering, for example, the E direction of manually controlled movement, effected as previously described by the manually controlled shift of the switch 85 to its position closing the WE contact 85b, and of switches 90, 92, 93 to their left-hand position, and of the valve 50 to its right-hand position. It will be apparent that the resulting manually controlled movement at maximum speed in E direction will operate to close the E contact 81b of direction switch 81 and to provide maximum speed for the WE generator 88. From the previous explanations of the automatic copying result it will also be apparent that if the E manual control is interrupted, as described, by the stylus striking the pattern during such E movement the instant maximum E speed of generator 88 will operate to maintain the switch contact 85b closed as before, and that the two closed contacts 81b and 85b will operate to maintain the same left-hand position of the switches 90, 92, 93 and right-hand position of valve 50 as was established and maintained for the manually controlled movement in E direction. For other manual-control approach directions the result is similar.

The described positioning of the switches and valve upon interruption of E manual control effects the $$\text{line} \frac{\text{out}}{\text{in}}$$

direction combination of $$E\frac{S}{N}$$

which is the same as would normally occur for straight-E automatic copying, as may be seen by reference to Figs. 1, 1A, 1B, and when the automatic control result takes over, upon interruption of the E manually controlled movement as described above, the automatic controls operate in the normal manner, previously described, to correct the relative rates of support movements to suit the instant angle of the pattern; and similarly for the N, S or W directions of manually controlled movement.

From the above it will be seen that the manual control means is interlocked with the pattern-control devices in such manner that either control may operate independently of the other, but if the operation of the manual control brings the tracer stylus within any zone normally controlled by an instant pattern the pattern-control means then becomes operative to effect pattern-controlled copying of the instant pattern. The manual control means may therefore be conveniently used to remove the tracer and tool away from the pattern and work during removal and replacement of work pieces, and to return the tracer and tool to operating position for automatic copying of the pattern.

For such operations, and for other purposes, suitable start-stop switch means, not shown, may be used for stopping the drive motor 3, Fig. 2, in any position of the supports 1, 2.

Referring to Figs. 5A, 5B it will be seen that a reversal of the copying directions of Figs. 1A, 1B changes the relative out and in directions for each of the N—S—W and E directions of line movement, as is shown by the direction arrows associated with the 0° copying angles of the different diagrams, whereby the 720° copying of Figs. 5A, 5B requires the $$\text{line} \frac{\text{out}}{\text{in}}$$

direction combinations $$N\frac{W}{E}, S\frac{E}{W}, W\frac{S}{N}, \text{ and } E\frac{N}{S}$$

The previously described machine may be used for the reversed copying of Figs. 5A, 5B without any changes other than to reverse the leads from switches 80, 81 to the switch 93. Thus, where the S contact 80b of switch 80 is connected to the coil 93j of switch 93 and the N contact 80a to the coil 93h as indicated in Fig. 5 the out-in control result of tracer 10 will be correspondingly reversed for the out-in movements of NS support 1; and where the W contact 81a of switch 81 is connected to the coil 91i of switch 93 and the E contact 81b to the coil 93k as indicated in Fig. 5 the result will be similarly correspondingly reversed for the out-in movements of WE support 2.

Any suitable well-known type of adjustable switch means, diagrammatically indicated at 120, Fig. 5, may be used for alternative connection of the coils 93h, 93i, 93j, 93k of switch 93, either in the manner indicated in Fig. 3 for the copying directions shown in Figs. 1A, 1B, or in the manner shown in Fig. 5 for the copying directions shown in Figs. 5A, 5B. The described manual control means of Fig. 4 is similarly operative in either adjustment of the switch means 120.

The described transmission mechanism for actuation of supports 1 and 2 is similar to that of Patent No. 2,493,828, as has been stated, and some of the operating characteristics of some of the described control mechanism are such as to be adapted to such particular type of transmission mechanism. It is to be understood, however, that in its broader aspects the invention is applicable, by suitable modification of the control devices in some instances, to any of various types of transmission mechanism which are operable for actuation of two supports in mutually transverse paths, and such modifications are contemplated.

Similarly, some of the described controls are electrical in nature, but the described control results are not necessarily limited to use of electrical devices, and the described switches, relays etc., in some or all instances, may be replaced by electronic tube controls etc. operating for substantially the same control results. Various such modifications of the control devices are contemplated.

In some of its broader aspects the invention relates, as will be apparent, to automatic control means effecting different tracer-controlled out and in direction movements, respectively from and toward the pattern, through a range of copying angles greater than could normally be effected by the tracer device; while maintaining relative speeds and directions of movement in a plurality of mutually transverse paths such as will effect a resultant movement in a direction to copy the instant pattern surface contacted by the tracer stylus. In the present machine such automatic control result is primarily accomplished by changing the out-in direction at intervals; the duration of the intervals between such changes, and the particular out-in directions resulting from any change, being determined by the configuration of the instant pattern. For such results the present machine utilizes a primary control means including the two switches 80, 81 which are responsive respectively to the instant direction of movement of the different supports 1 and 2, together with the switch 85 which is responsive to the instant angle of copying movement, as determined by the relative support speeds. The collective purpose of such primary control devices is to automatically determine, in accordance with the configuration of the instant pattern, the intervals between changes of out-in direction and the particular out-in direction combination which will result when a change occurs. Such purpose may be effected by a variety of means suitably responsive to changes of pattern configuration and it is to be understood that various modifications of the specific means shown and described are contemplated.

What is claimed is:

1. In a copying machine the combination of a master and a tracer relatively movable through a range of 720° of angular movement directions, power operable transmission mechanism operatively connected to said relatively movable master and tracer for effecting said relative movements, control mechanism operatively connected to said transmission mechanism and to said tracer and operable under the control of said master and tracer to control said transmission mechanism in a manner causing copying movement for a tool to follow a work piece in a path determined by the master, said tracer being operative during said copying movement for controlling said relative movement for opposite out and in directions respectively effecting relative master and tracer movement from and toward one another, control connections interconnected with said transmission control mechanism and operative to apply said out and in tracer control selectively in different path directions, and control means responsive to and operative in accordance with changes of copying direction and connected to effect adjustment of said control connections said control means comprising adjustable spaced contacts operative upon said control connections for establishing a predetermined minimum change of copying direction between successive connection adjustments.

2. In a copying machine the combination of two supports movable respectively in different of mutually transverse paths and each movable in either of opposite directions in its path, power operable transmission mechanism operatively connected to said movable supports in a manner effecting said support movement, control mechanism for controlling said transmission mechanism including a pattern and a tracer operatively connected to said transmission mechanism in a manner controlling copying movement of said supports for causing a tool to follow a work piece in substantially conformity with the configuration of said pattern, said tracer being operative during said copying movements to effect support movements in out and in directions respectively effecting movement of the pattern and tracer from and toward one another, control connections interconnected with said control mechanism and operative to cause said out and in control effect of the tracer to be alternatively applied to the one or the other of said supports, a control device operative in accordance with changes in the angle of the instant copied pattern portion as referred to one of the paths of support movement, and control means connected to said control device and operable from time to time in accordance with the operation of said control device for adjustment of said control connections, said control device including movable contacts adjustable for establishing a predetermined minimum change of pattern angle between successive connection adjustments.

3. In a copying machine the combination of two supports movable respectively in different of mutually transverse paths and each movable in either of opposite directions in its path, power operable transmission mechanism for said support movements, control mechanism for said transmission mechanism including a pattern and a tracer operatively controlling copying movements of said supports for a tool to follow a work piece in substantial conformity with the configuration of said pattern, said tracer being operative during said copying movements to effect support movements in out and in directions respectively effecting movement of the pattern and tracer from and toward one another, said control mechanism including connections adjustable for said out and in control effect to be selectively applied to the one or the other of said supports and adjustable for determining the respective directions for the out and in movements of the selected support, a controller including a portion adjustable in accordance with the angle of the instant copied pattern portion as referred to one of said paths of support movement and a portion adjustable in accordance with the instant directions of support movement, and control means operable from time to time in accordance with the adjustments of said controller for adjustment of said control connections, said controller including means operative for establishing a predetermined minimum change of pattern angle between successive connection adjustments.

4. In a copying machine the combination of two supports movable respectively in different of mutually transverse paths and each movable in either of opposite directions in its path, power operable transmission mechanism for said support movements, control mechanism for said transmission mechanism including a pattern and a tracer operatively controlling the relative speeds and movement directions of said supports for a tool to copy the configuration of said pattern on a work piece, said tracer being operative during said copying to effect support movements in out and in directions respectively effecting movement of the pattern and tracer toward and from one another, said control mechanism including control connections adjustable for said out and in control effects of the tracer to be alternatively applied to the one or the other of said supports and adjustable for determining the respective directions for the out and in movements of the selected support, a first device adjustably responsive to the instant relative speeds of said supports, a second device adjustably responsive to the instant directions of movement of each of said supports, and control means operable from time to time during said copying movement to adjust said control connections for changing said tracer out-in control from one to the other of said supports at intervals determined by the adjustment of said first device and simultaneously determining the respective out and in directions of movement of the selected out-in support in accordance with the adjustment of said second device, said first device including means operative for establishing a predetermined minimum change of relative speeds of said supports between successive connection adjustments.

5. In a copying machine the combination of two supports movable respectively in different of mutually transverse paths and each movable in either of opposite directions in its path, power operable transmission mechanism for said support movements at various relative rates, control mechanism for said transmission mechanism including means for alternative acceleration or deceleration of the rate of movement of either support and a pattern and tracer operatively controlling said acceleration-deceleration means for copying movements of the supports for a tool to follow a work piece in substantial conformity with the configuration of said pattern, said tracer being operative during said copying movements to effect cyclic alternate phases of said acceleration and deceleration, said control mechanism including control connections adjustable for said tracer effect to be selectively applied for the control of the one or the other of said supports and adjustable for determining the respective directions of the acceleration and deceleration results for the selected support, and control means operable during said copying movements for adjustment of said control connections at intervals determined by change of the angle of the instant copied portion of the pattern configuration as referred to one of the paths of support movement, the last mentioned control means including means operative for establishing a minimum change of pattern angle between successive adjustments of said connections.

6. In a copying machine including a pattern and a tracer the combination of two supports respectively movable in mutually transverse NS and WE paths and each movable in either direction in its path, power operable transmission mechanism for effecting said support movements, a first controller for controlling said transmission mechanism operable under the control of said pattern and tracer for effecting their relative movement in any direction in a plane parallel to said support paths for causing a tool to follow a work piece in a path determined by the pattern, a second controller for controlling said transmission mechanism including a manually movable member limited to movement in directions corresponding to the N, S, W or E path directions, and control connections operable upon movement of said manually movable control member in selected direction and operative upon said transmission mechanism to effect the corresponding direction of support movement.

7. In a copying machine the combination of a plurality of movable supports, a pattern, a tracer adjustable for out and in control effects respectively for movement of said tracer and pattern from and toward one another, power operable transmission mechanism for support movements through a direction range of 360° of angular movements, a copying controller for said transmission mechanism operable under the control of said pattern and tracer for a tool to follow a work piece in a path determined by the pattern, a second controller for said transmission mechanism including a manually adjustable member limited to movement in four directions spaced about 90° apart and control connections operable in accordance with the direction of movement of said member for said transmission mechanism to effect a corresponding direction of support movement, and interlock means interconnecting said controllers for operation one at a time.

8. In a copying machine the combination of a plurality of movable supports, a pattern, a tracer adjustable for out and in control effects respectively for movement of said tracer and pattern from and toward one another, power operable transmission mechanism for support movements through a direction range of 360° of angular movements, a copying controller for said transmission mechanism operable under the control of said pattern and tracer for a tool to follow a work piece in a path determined by the pattern, a second controller for said transmission mechanism including a manually adjustable member limited to movement in four directions spaced about 90° apart and control connections operable in accordance with the direction of movement of said member for said transmission mechanism to effect a corresponding direction of support movement, interlock means limiting said controllers for operation one at a time, and supplemental manually operable means for change over from operation of said copying controller to operation of said second controller.

9. In a copying machine the combination of a plurality of movable supports, a pattern, a tracer adjustable for out and in control effects respectively for movement of said tracer and pattern from and toward one another, power operable transmission mechanism for support movements through a direction range of 360° of angular movements, a copying controller for said transmission mechanism operable under the control of said pattern and tracer for a tool to follow a work piece in a path determined by the pattern, a second controller for said transmission mechanism including a manually adjustable member limited to movement in four directions spaced about 90° apart and control connections operable in accordance with the direction of movement of said member for said transmission mechanism to effect a corresponding direction of support movement, interlock means limiting said controllers for operation one at a time, and supplemental control means operable under the control of said pattern and tracer for change over from operation of said second controller to operation of said copying controller when said tracer contacts the pattern during operation of said second controller.

10. In a copying machine the combination of a plurality of movable supports, a pattern, a tracer adjustable for out and in control effects respectively for movement of said tracer and pattern from and toward one another, power operable transmission mechanism for support movements through a direction range of 360° of angular movements, a copying controller for said transmission mechanism operable under the control of said pattern and tracer for a tool to follow a work piece in a path determined by the pattern, a second controller for said transmission mechanism including a manually adjustable member limited to movement in four directions spaced about 90° apart and control connections operable in accordance with the direction of movement of said member for said transmission mechanism to effect a corresponding direction of support movement, interlock means limiting said controllers for operation one at a time, supplemental manually operable control means for change over from operation of said copying controller to operation of said second controller, and other supplemental control means operable under the control of said pattern and tracer for change over from operation of said second controller to operation of said copying controller when said tracer contacts the pattern during operation of said second controller.

11. In a copying machine the combination of two supports movable respectively in different of mutually transverse paths and each movable in either of opposite directions in its path, power operable transmission mechanism for said support movements, a copying controller for said support movements including a pattern and a tracer having out and in control effects respectively for movement of the pattern and tracer from and toward one another for a tool to follow a work piece in a path determined by the configuration of the pattern, said copying controller including control connections for said transmission mechanism adjustable for said out and in control effects to be alternatively applied to the one or the other support movement and in the one or the other directions thereof and including trip means for adjustment of said connections from time to time at intervals as determined by the pattern configuration, and a manually operable controller for said transmission mechanism for movement of said supports in either direction of either of said paths, said manually operable controller including means adjusting said transmission control connections during the manually controlled movements to effect the same adjustments thereof which would be effected by said trip means for the same direction of support movement during the operation of said copying controller.

12. In a copying machine the combination of two supports movable respectively in different of mutually transverse paths and each movable in either of opposite directions in its path, power operable transmission mechanism for said support movements, a copying controller for said support movements including a pattern and a tracer having out and in control effects respectively for movement of the pattern and tracer from and toward one another for a tool to follow a work piece in a path determined by the configuration of the pattern, said copying controller including control connections for said transmission mechanism adjustable for said out and in control effects to be alternatively applied to the one or the other support movement and in the one or the other direction thereof and including trip means for adjustment of said connections from time to time at intervals as determined by the pattern configuration, a manually operable controller for said transmission mechanism for movement of said supports in either direction of either of said paths, said manually operable controller including means adjusting said transmission control connections during the manually controlled movements to effect the same adjustments thereof which would be effected by said trip means for the same direction of support movement during operation of said copying controller, and interlock means interconnecting said controllers for operation one at a time.

13. In a copying machine the combination of two supports movable respectively in different of mutually transverse paths and each movable in either of opposite directions in its path, power operable transmission mechanism for said support movements, a copying controller for said support movements including a pattern and a tracer having out and in control effects respectively for movement of the pattern and tracer from and toward one another for a tool to follow a work piece in a path determined by the configuration of the pattern, said copying controller including control connections for said transmission mechanism adjustable for said out and in control effects to be alternatively applied to the one or the other support movement and in the one or the other direction thereof and including trip means for adjustment of said connections from time to time at intervals as determined by the pattern configuration, a manually operable controller for said transmission mechanism for movement of said supports in either direction of either of said paths, said manually operable controller including means adjusting said control connections during the manually controlled movements to effect the same adjustments thereof which would be effected by said trip means for the same direction of support movement during operation of said copying controller, interlock means limiting said controllers for operation one at a time, and supplemental manually operable means for change over from operation of said copying controller to operation of said second controller.

14. In a copying machine the combination of two supports movable respectively in different of mutually transverse paths and each movable in either of opposite directions in its path, power operable transmission mechanism for said support movements, a copying controller for said support movements including a pattern and a tracer having out and in control effects respectively for movement of the pattern and tracer from and toward one another for a tool to follow a work piece in a path determined by the configuration of the pattern, said copying controller including control connections for said transmission mechanism adjustable for said out and in control effects to be alternatively applied to the one or the other support movement and in the one or the other direction thereof and including trip means for adjustment of said connections from time to time at intervals as determined by the pattern configuration, a manually operable controller for said transmission mechanism for movement of said supports in either direction of either of said paths, said manually operable controller including means adjusting said control connections during the manually controlled movements to effect the same adjustments threof which would be effected by said trip means for the same direction of support movement during operation of said copying controller, interlock means limiting said controllers for operation one at a time, and supplemental control means operable under the control of said pattern and tracer for change over from operation of said second controller to operation of said copying controller when said tracer contacts the pattern during operation of the second controller.

15. In a copying machine the combination of two supports respectively movable in mutually transverse paths and each movable in either direction in its path, power operable transmission mechanism for effecting said support movements, control mechanism for controlling said transmission mechanism including a pattern and a tracer cooperatively controlling contour copying movements of said supports through a range of 360° of one direction of change of copying directions and also through a range of 360° of the opposite direction of change of copying directions, and supplemental control means including switching apparatus manually operable for alternative selection of either clockwise or counter-clockwise change of copying directions for one of said 360° of direction change and simultaneously selective of the opposite direction of change for the other 360° of direction change.

16. In a tracer controlled machine tool adapted for contouring operations, two carriages arranged for reciprocating motion along mutually transverse paths, a tracer mechanism, a pattern, said tracer mechanism and said pattern being operatively connected to said carriages in a manner providing for relative movement by said carriages for cooperative action, and out-in control system operatively interconnecting said tracer mechanism and said reciprocating carriages and arranged to be actuated by said tracer mechanism and operative to effect movement of either of said carriages in either direction selectively in response to operation of said tracer in following said pattern, an out-in direction switch operatively connected to said control system in a manner to control the direction of out-in movement selectively, a line control system operatively connected to said out-in control system in a manner to respond to operation of said out-in control system and operative to effect coordinated movement of the other of said carriages in either direction selectively in accordance with the out-in movements effected by said tracer mechanism, a line direction switch operatively connected to control the direction of line movement selectively, a selector switch operative to select the carriage to be moved by operation of said out-in control system and to connect the other carriage for coordinated line movement, switches responsive to the direction of movement of each of said carriages and operatively connected to control said out-in direction and said line direction switches, and a switch responsive to the relative rates of movement of said two carriages and operatively connected to actuate said carriage selector switch and to cooperate with said direction responsive switches in controlling said direction selecting switches.

17. In a tracer controlled machine tool adapted for contouring operations, two carriages arranged for reciprocating motion along mutually transverse paths, a tracer mechanism and a pattern operatively connected to said carriages respectively and arranged for relative movement by said carriages for cooperative action, an out-in control system operatively interconnecting said carriages and said tracer mechanism and arranged to be actuated by said tracer mechanism in a manner operative to effect movement of either of said carriages in either direction selectively in response to operation of said tracer in following said pattern, a line control system operatively connected to said out-in control system in a manner to respond to operation of said out-in control system and operative to effect coordinated movement of the other of said carriages in either direction selectively in accordance with the out-in movements effected by said tracer mechanism, control switches responsive to the direction of movement of each of said carriages, a control switch responsive to the relative rates of movement of said two carriages, and control mechanism operatively interconnecting said switches and said out-in control system in a manner responsive to both said direction responsive switches and said rate responsive switch and operative to select the one or the other of said carriages for operation by said out-in control system and the direction of movement of said carriages under said control.

18. In a tracer controlled machine tool adapted for contouring operations, two carriages arranged for reciprocating motion along mutually transverse paths, a tracer mechanism, a pattern, said tracer mechanism and said pattern being operatively connected to said carriages in a manner providing for relative movement by said carriages for cooperative action, an out-in control system operatively interconnecting said tracer mechanism and said carriages in a manner arranged to be actuated by said tracer mechanism and operative to effect movement of either of said carriages in either direction selectively in response to operation of said tracer mechanism in following said pattern, a line control system operatively interconnecting said out-in control system and said carriages in a manner arranged to respond to operation of said out-in control system and operative to effect coordinated movement of the other of said carriages in either direction selectively in accordance with the out-in movements effected by said tracer mechanism connected to said line control system and, control mechanism operative to select the direction of line movement of said other carriage, switches responsive to the direction of movement of each of said carriages, a switch responsive to the relative rates of movement of said two carriages, control mechanism operatively connected with said switches in a manner responsive to the combined operation of said direction and rate responsive switches to select the carriage to be moved by said out-in control system, and other control mechanism operatively connected with said switches in a manner responsive to the operation of said switches and operative upon said line direction selecting mechanism to select the direction of line movement.

FRED A. PARSONS.

REFERENCES CITED

The following references are of record in the file of this patent:

UNITED STATES PATENTS

| Number | Name | Date |
|---|---|---|
| 2,036,362 | Sassen | Apr. 7, 1936 |
| 2,331,337 | Meyer | Oct. 12, 1943 |

FOREIGN PATENTS

| Number | Country | Date |
|---|---|---|
| 505,470 | Great Britain | May 11, 1939 |

Certificate of Correction

Patent No. 2,521,185 September 5, 1950

FRED A. PARSONS

It is hereby certified that error appears in the printed specification of the above numbered patent requiring correction as follows:

Column 5, line 27, for "rae" read *rate*; column 6, line 48, before the word "position" insert *in*; column 23, line 72, for "value" read *valve*; column 30, line 72, for "racer" read *tracer*; column 34, lines 46 and 47, for "connected to said line control system and, control mechanism" read , *control mechanism connected to said line control system and*; and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*